Figure 1:
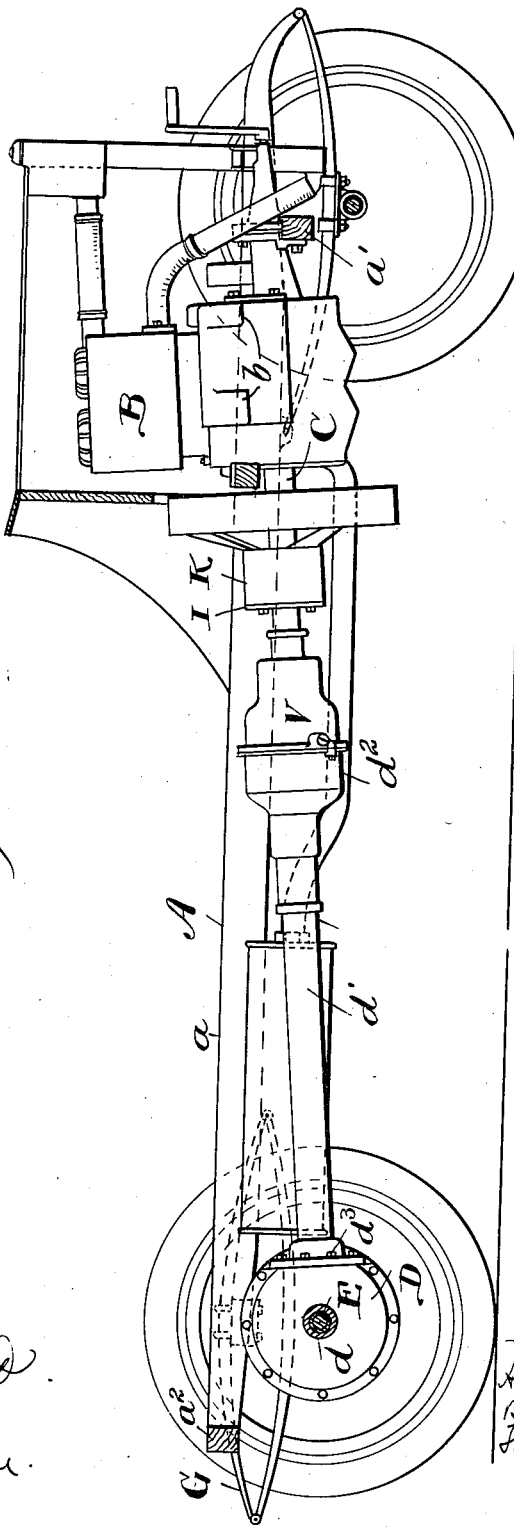

A. P. BRUSH.
MOTOR VEHICLE.
APPLICATION FILED NOV. 18, 1908.

966,519.

Patented Aug. 9, 1910.
2 SHEETS—SHEET 1.

Witnesses.
E. B. Gilchrist.
H. R. Sullivan.

Inventor:
Hanson P. Brush
By Thurston Woodward
Attorneys

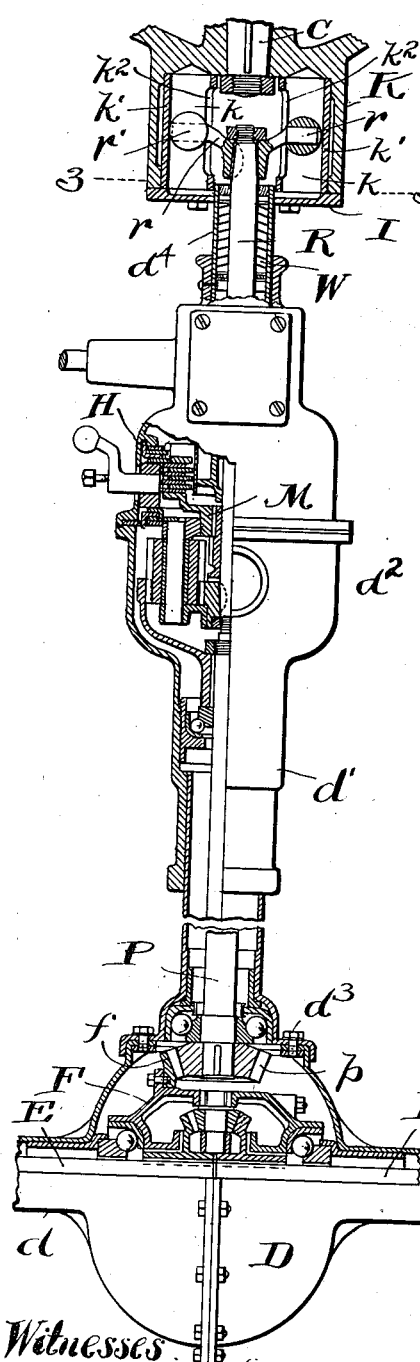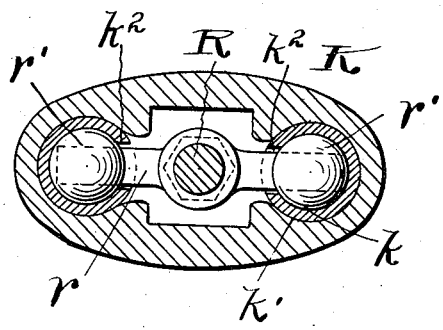

UNITED STATES PATENT OFFICE.

ALANSON P. BRUSH, OF DETROIT, MICHIGAN.

MOTOR-VEHICLE.

966,519.

Specification of Letters Patent. Patented Aug. 9, 1910.

Application filed November 18, 1908. Serial No. 463,149.

*To all whom it may concern:*

Be it known that I, ALANSON P. BRUSH, a citizen of the United States, residing at Detroit, in the county of Wayne and State of Michigan, have invented a certain new and useful Improvement in Motor-Vehicles, of which the following is a full, clear, and exact description.

The invention relates particularly to the mechanism through which the motor is caused to drive the vehicle.

The object of the invention is to provide a construction for this purpose having numerous advantages over the constructions, most nearly resembling it, employed for the same purpose, such advantages relating particularly to the cheapness, simplicity and efficiency of the construction, to a material reduction in weight of the structure, and to the ease with which the mechanism may be taken apart and reassembled when any repairs are necessary.

In the drawings, Figure 1 is a sectional side elevation of a motor car embodying the invention. Fig. 2 is a plan view partly sectioned of a little more than one half of the rear axle structure, and of the mechanism connecting the same with the motor shaft. Fig. 3 is a transverse sectional view in the plane of line 3—3 on Fig. 2.

The main frame A of the vehicle may be of any suitable construction, but it only includes essentially two side members $a$, and the front transverse member $a'$, and the rear transverse member $a^2$. Any suitable motor B may be fixed to the front part of said frame. As shown, the front end of the motor is fixed to the transverse member $a'$, and the rear end of the motor has two laterally extended arms $b$ which are respectively secured to the two side members $a$. The main drive shaft is indicated by C. It is preferable to employ, and the drawing shows, an internal combustion engine as the motor; and the shaft C, as shown, is the crank shaft of the engine. The shaft extends longitudinally rearward, and is preferably inclined slightly downward toward its rear end so that, under normal conditions, it will be in substantial alinement with a transmission shaft to which it imparts motion.

The rear or driving axle is of familiar form. It includes the two revolving axle sections E, E, and suitable differential mechanism F, by which they are connected, and a shell or casing wherein these parts are mounted and by which they are inclosed. This shell or casing comprises a central gear case D, two laterally extending tubes $d$ fixed thereto and a forwardly extended tubular torque member $d'$ which is fixed to the central gear case by means of bolts $d^3$ which permit its easy disconnection. The tubes $d$ are connected to the frame by means of springs G in the usual or any suitable manner. There is, however, one noticeable characteristic of the structure shown in the drawing, namely, that these springs furnish the only necessary driving connection between the rear axle structure and the frame of the machine, which is believed to be novel in automobiles having a shaft drive.

Within the torque member $d'$ is the mechanism for transmitting controlled motion from the main driving shaft C to the differential mechanism. This transmission and controlling mechanism includes two alined transmission shafts R and P, suitable change speed gearing M, and a clutch H. The rear transmission shaft is provided with a beveled gear $p$ which meshes with the beveled driving gear $f$ of the differential mechanism. The clutch employed may be of any suitable construction. The change speed mechanism may likewise be of any suitable construction; but whatever may be the construction of the clutch and change speed mechanism, these are, according to this invention inclosed by and suitably mounted in an enlargement $d^3$ of the torque member, which enlargement is located near the front end of said torque member. By so locating these parts, they not only serve the function for which they are primarily provided, but they make it possible to shorten and simplify the mechanisms by which they are operated, which mechanisms must be near the driver's seat, and will be a little behind said enlargement $d^3$ of the torque member.

It is a well known fact that in the operation of a motor car having a rear axle structure substantially like that shown provided with a forwardly extended torque member, the tendency of the torque member is upward. By the location of the clutch and change speed mechanism in the torque member near the forward end thereof, they not only serve the functions stated, but, by their weight, they counteract and substantially overcome the normal tendency of the torque member to swing upward.

The shaft R is mounted on suitable antifriction bearings shown, as roller bearings W in the forward end of the torque member; and it projects forward out of the front end of the torque member. This projecting part of said shaft has a telescopic universal joint connection with the main driving shaft C. The specific construction shown for so connecting the driving shaft C and the shaft R consists of a hub K fixed to the shaft C and having two diametrically opposed longitudinally extended grooves k. The shaft R has secured to its ends two arms r which extend laterally therefrom in diametrically opposite directions and are ball shaped on their outer ends. The combined length of these two arms is just a trifle less than the diametrical distance between the bottoms of the grooves k. The ball shaped ends of said arms enter the grooves k and are capable of moving longitudinally therein, or of rocking in said grooves in two relatively transverse directions as much as is necessary to preserve an efficient driving connection between shaft C and shaft R as they are disalined when the car is in use. The so-called grooves k are preferably produced by small steel tubes k' driven into suitable recesses in the hub K and provided with longitudinal slots $k^2$ through which arms r extend loosely.

Attention is particularly called to the fact that the front end of the transmission shaft R is supported by the main driving shaft C, and that the forward end of the torque member has no support save what it derives from the shaft R. It is not connected with the frame, and therefore does not serve in any degree as a driving strut. It has through the described mechanism a telescoping universal joint support upon the driving axle, and therefore the torque effect of the rear axle is transmitted to the main shaft C, instead of to a part of the frame as in prior structures. The cap plate I is secured to the rear end of the hub K, and it has a hole through it for the passage of the front end of the torque member. Attention is particularly called, however, to the fact that this torque member does not touch this plate. The function of the plate is to keep dirt out of the hub, to retain lubrication therein, and to prevent the accidental withdrawal of the end of the shaft R from said hub.

Having described my invention, I claim:

In an automobile, the combination of a frame, a motor fixed to the front end thereof, a longitudinally extended main shaft driven by said motor, a rear axle structure which includes a casing having a forwardly extended tubular torque member which is removably connected with the differential gear casing of the rear axle structure and is enlarged near its front end, transmission controlling mechanism mounted in said enlargement, and two transmission shafts mounted in said torque member and adapted to be variously connected by said controlling mechanism, one of said shafts being operatively connected with the rotating mechanism of the rear axle structure and the other of said shafts having a telescoping universal joint connection with the main shaft.

In testimony whereof, I hereunto affix my signature in the presence of two witnesses.

ALANSON P. BRUSH.

Witnesses:
H. R. SULLIVAN,
E. L. THURSTON.